United States Patent [19]

Ohta et al.

[11] Patent Number: 4,677,601
[45] Date of Patent: * Jun. 30, 1987

[54] METHOD OF FORMING PERMANENT MEMORY LOCATIONS IN A MAGNETOOPTIC MEMORY MEDIUM

[75] Inventors: Kenji Ohta, Yao; Toshihisa Deguchi; Akira Takahashi, both of Nara, all of Japan

[73] Assignee: Sharp kabushiki Kaisha, Osaka, Japan

[ * ] Notice: The portion of the term of this patent subsequent to Aug. 21, 2001 has been disclaimed.

[21] Appl. No.: 585,179

[22] Filed: Mar. 1, 1984

Related U.S. Application Data

[62] Division of Ser. No. 237,083, Feb. 23, 1981, Pat. No. 4,467,383.

[30] Foreign Application Priority Data

Feb. 23, 1980 [JP] Japan .................................. 55-21910
Feb. 27, 1980 [JP] Japan .................................. 55-25980
Apr. 9, 1980 [JP] Japan .................................. 55-47362

[51] Int. Cl.$^4$ ............................................ G11B 7/007
[52] U.S. Cl. ...................................... 369/13; 365/122; 369/100; 369/121; 369/288; 428/694; 428/900
[58] Field of Search ................ 365/122; 428/692, 694, 428/900; 360/131, 135; 369/288, 100, 121

[56] References Cited

U.S. PATENT DOCUMENTS

| | | | |
|---|---|---|---|
| 3,514,766 | 5/1970 | Mee et al. | 365/171 |
| 4,091,171 | 5/1978 | Ohta et al. | 422/164 |
| 4,126,494 | 11/1978 | Imamura et al. | 148/108 |
| 4,202,022 | 5/1980 | Imamura et al. | 75/123 E |
| 4,310,899 | 1/1982 | Biesterbos et al. | 365/122 |
| 4,390,600 | 6/1983 | Ohta et al. | 428/900 |
| 4,412,264 | 10/1983 | Imamura et al. | 360/131 |

*Primary Examiner*—George F. Lesmes
*Assistant Examiner*—William M. Atkinson
*Attorney, Agent, or Firm*—Birch, Stewart, Kolasch and Birch

[57] ABSTRACT

Disclosed is a new magnetic storage medium including a layer of amorphous material typically GdDyFe whose Curie recording point (e.g., 120° C.) is lower than its crystallization point (e.g., 350° C.) to enable crystallization to cause variations in its optical properties such as transmittance or reflectivity for thermomagnetic writing. Reversible recordings are set up on the amorphous material layer by a thermomagnetic writing technique, for example Curie point writing, while unchangeable or permanent recordings are set up on the amorphous material layer through laser-activated crystallization of the amorphous material layer.

6 Claims, 5 Drawing Figures

1

METHOD OF FORMING PERMANENT MEMORY LOCATIONS IN A MAGNETOOPTIC MEMORY MEDIUM

This application is a divisional of copending application Ser. No. 237,083, filed on Feb. 23, 1981 now U.S. Pat. No. 4,467,383.

BACKGROUND OF THE INVENTION

This invention relates to a magnetooptic data storage medium of amorphous magnetic material and more particularly to a magnetooptic data storage medium including changeable and readable memory locations and unchangeable memory locations.

In recent years, optical memory systems for high packing density storage have received particularly intensive study. This sort of optical memory system can be classified into the following categories, depending on data storage properties.

(1) it is readable only;
(2) it can hold additional recordings and is readable immediately after writing; and
(3) it is writable, readable and erasable.

Of these three different categories the last is most suitable for optical memory applications and typically comprises amorphous magnetic films as a storage medium.

Furthermore, the methods of writing for the magnetooptic storage medium developed to data are as follows: (a) Curie point writing technique by which the temperature of a memory bit location is elevated above the Curie point where magnetizations are destroyed; (b) a compensation temperature technique which takes advantage of the coercivity falling when the memory bit location at about the compensation temperature is further heated; (c) a temperature dependent coercivity technique relying upon the phenomemon where coercivity varies greatly with a temperature rise. Recording is achieved by applying a laser beam onto the memory bit location and thus varying magnetizations in light-activated locations due to temperature increases. Erasing recordings demands energy for restoring the original magnetizations, using the same optical system as for writing. Amorphous magnetic material is well known as this sort of a changeable optical memory medium. Reversibility of the medium, however, results in erasing recordings upon malfunction of erroneous operation of a recording system and making data unstable due to fluctuations in the ambient temperature.

OBJECTS AND SUMMARY OF THE INVENTION

Accordingly, it is an object of the present invention to provide a magnetooptic recording medium which has a writable and erasable memory location for thermomagnetic writing and erasing and magnetopical reading and an unchangeable memory location for only magnetooptical recording.

BRIEF DESCRIPTION OF THE DRAWINGS

For a more complete understanding of the present invention and for further objects and advantages thereof, reference is now made to the following description taken in conjunction with the accompanying drawings, in which.

DETAILED DESCRIPTION OF THE INVENTION

Figure 1:
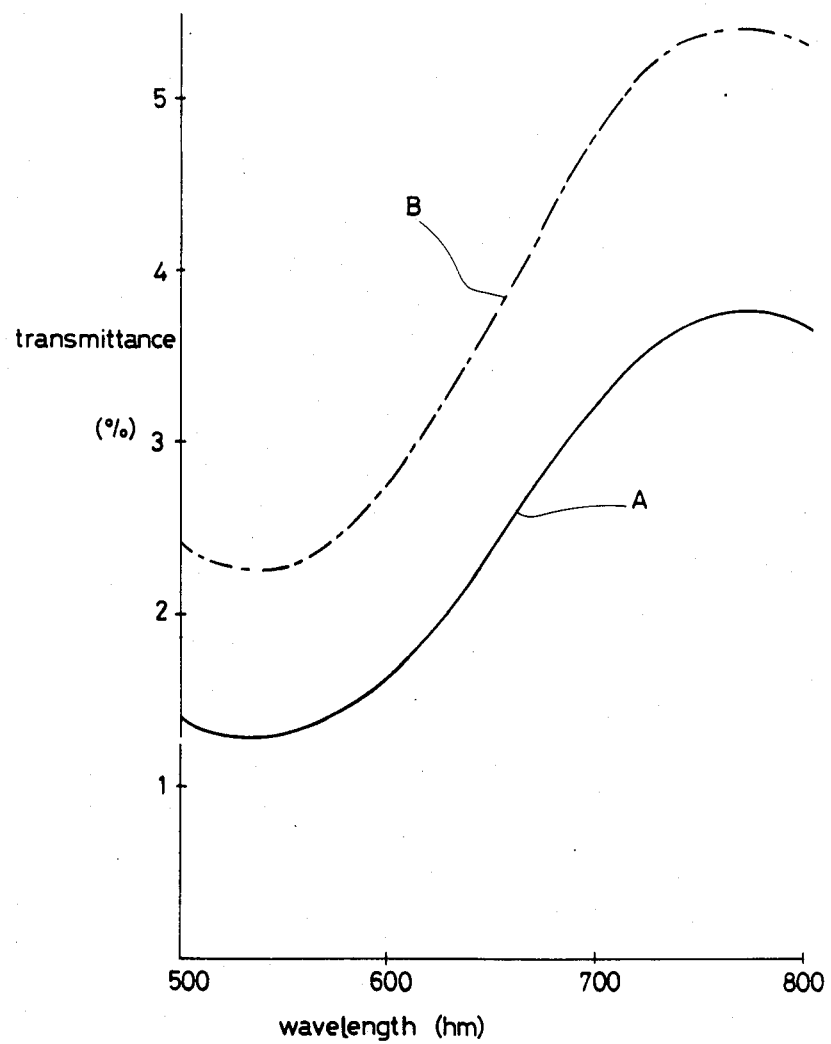
FIG. 1 is a graph plotting transmittance of a GdDyFe film in the amorphous state and crystallized state overcovered with a $SiO_2$ layer as a function of wavelength.
Figure 2:
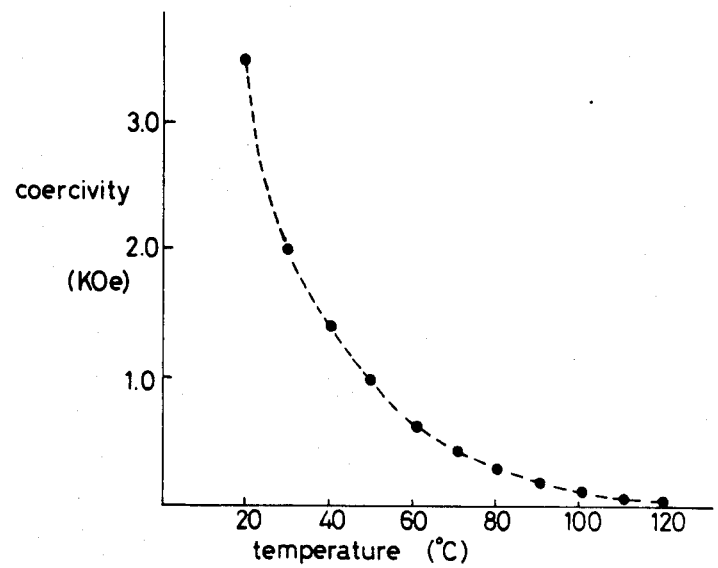
FIG. 2 is a graph showing the relation between coercivity and temperature.

A film of amorphous magnetic material including rare earth metals and transition metals manifests an increase in transmittance and a decrease in reflectivity by crystallization, as is clear from FIG. 1 where the curve A shows the amorphous state of the film and the curve B shows the crystallized state. Of particular interest is GdDyFe which which exhibits a remarkable trend to vary its transmittance or reflectivity depending whether it is in the amorphous state or the crystallized state. This leads to the possibility that crystallizing desired individual bit locations can provide brightness-varying signals in reading out the locations via a light detector and an optical readout system (using Faraday effect or the like). It is obvious from FIG. 2 that the Curie point of the amorphous magnetic material GdDyFe is approximately 120° and the phase transition point from the amorphous to the crystallized state is 350°. There is therefore a difference of temperature sufficient to enable both Curie point writing (as a changeable memory) and crystallization writing (as an unchangeable or permanent memory) or the same medium by varying the intensity of a recording light source.

Figure 3:
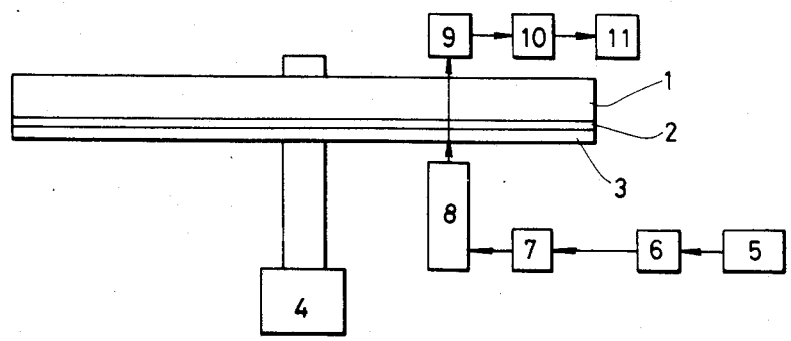
FIG. 3 is a schematic diagram of an optical data storage device using Faraday effect.

In other words, as seen from FIG. 3, a thin film 2 of amorphous GdDyFe whose Curie point recording is possible at a first temperature significantly lower than that of the second crystallization or transition temperature is deposited on a substate 1 of glass or transparent plastic. An example of the substrate 1 used is glass, acryl or polycarbonate. The GdDyFe thin film 2 is overcovered with a protective film 3 of $SiO_2$, thus completing a magnetooptic recording medium. Then, the memory medium is shaped into a disk which is driven at an appropriate rate by a rotating driving system 4 such as a motor.

To record (write) and fetch (read) data on and from the above-mentioned storage medium, there is provided an optical memory system which relies upon Curie point writing and readout using the magnetooptical Faraday effect of the thin film. In this drawing, a laser 5 typically of He-Ne is provided which emits a laser beam via a light modulator 6 and a polarizer 7 toward an optical system 8 including a mirror for changing the direction of its optical path and a recording lens. The optical system 8 is located vis-a-vis with memory bit locations of the storage medium to apply the laser beam thereto so that data may be written as the changeable recording or the unchangeable recording, based on the output level of the laser beam. Furthermore, the data fetched from the storage medium 1 is led to an analyzer 10 via an optical system 9 including a mirror for changing the optical path and a condensor lens and then to a light detector 11. This results in reading the data from the changeable memory locations and the unchangeable memory locations.

Although the foregoing has set forth the use of the GdDyFe film as a typical example of the amorphous magnetic material, other materials whose recording temperatures are lower than its crystallization points to enable crystallization to cause a difference in transmittance or reflectivity are available for the purpose of the present invention, for example, GdTbFe, DyFe, TbFe, etc. Especially a GdTbFe film (e.g., GdTbFe ratio 0.24:0.18:1 and thickness=500-800 Å) is suitable for this sort of storage medium. Methods of writing and reading other than the above mentioned Curie point writing and Faraday effect reading are also useful as far as the present invention is concerned.

As noted earlier, the present invention utilizes the temperature dependency of the magnetization properties and crystallization properties of the amorphous magnetic material, thus making it possible to set up both the reversible recordings and unchangeable recordings on the same storage medium. More particularly, the permanent (unchangeable) recordings are made with no possible destruction of information. In addition, writing and reading require no particular expenditure.

Generally speaking, a high packing density storage medium has recording tracks each of a width in the order of 1 μm. For writing and reading by the laser beam to be practical, it is essential that the laser beam be aimed on only a track sought to be written or read and not other tracks. To this end a precision optical system or a servo system with the help of guide tracks is necessary.

Figure 4:
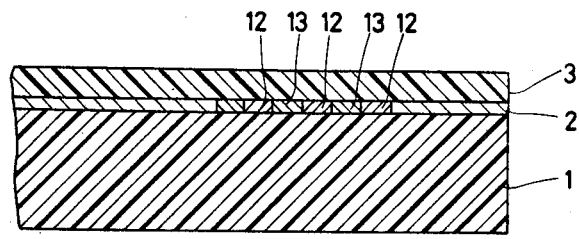
FIG. 4 is a storage medium with guide tracks according to the present invention.
Figure 5:
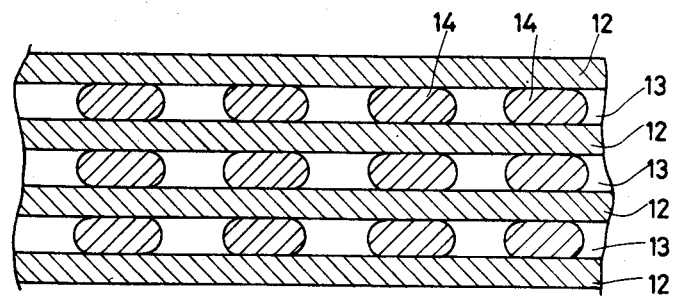
FIG. 5 is an enlarged view of the guide tracks in FIG. 4.

In another preferred aspect of the present invention, the unchangeable recordings are effectively utilized as guide tracks for the laser-addressing technique. FIGS. 4 and 5 illustrate a magnetooptic data storage medium with crystallized guide tracks. The guide tracks 12 are formed to be flush with recording (reversible) tracks 13. In order to form the guide tracks 12 as narrow as possible, the laser beam of a short wavelength is employed, for example, Ar laser beam of about 4880 Å. Especially, both sides of a respective one of the recording tracks 13 are heated to above the crystallization temperature (typically, 350° C.) for the setup of the guide tracks 12.

In the case where the guide tracks 12 are set up along the recording tracks in this manner, the recording tracks 13 are never crystallized to ensure that the recordings are stable even during exposure of the laser beam for the setup of record bits 14 at a first temperature near the Curie point (about 100° C.). Furthermore, the other recording tracks 13 are not affected by exposure of the laser beam because of the recording tracks being sandwiched between the guide tracks 12.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A method for forming permanent memory locations in a magnetic storage medium, comprising the steps of:

providing a uniform layer of magnetic-optic material having predetermined physical characteristics, said uniform layer functioning as a changeable and optically readable amorphous magnetic memory medium; and exposing desired locations of said uniform layer to a heat ray to irreversibly form permanent memory locations by changing said physical characteristics at said desired locations.

2. The method of claim 1, wherein said heat ray is a laser beam which changes the transmittance of said uniform layer.

3. The method of claim 1, wherein said permanent memory locations are arranged to form guide tracks.

4. A method for forming permanent memory locations in an information storage medium, comprising the steps of:

proving a uniform layer of magneto-optic material having predetermined physical characteristics and functioning as a changeable and readable amorphous memory medium; and exposing desired locations of said uniform layer to a heat ray to irreversibly form permanent memory locations by changing said physical characteristics at said desired locations.

5. The method of claim 4, wherein said heat ray is a laser beam which changes the transmittance of said uniform layer.

6. The method of claim 4, wherein said permanent memory locations are arranged to form guide tracks.

* * * * *